Jan. 8, 1924.
C. MAJEWICZ
1,480,172
SAW SHARPENING MACHINE
Filed Aug. 7, 1922
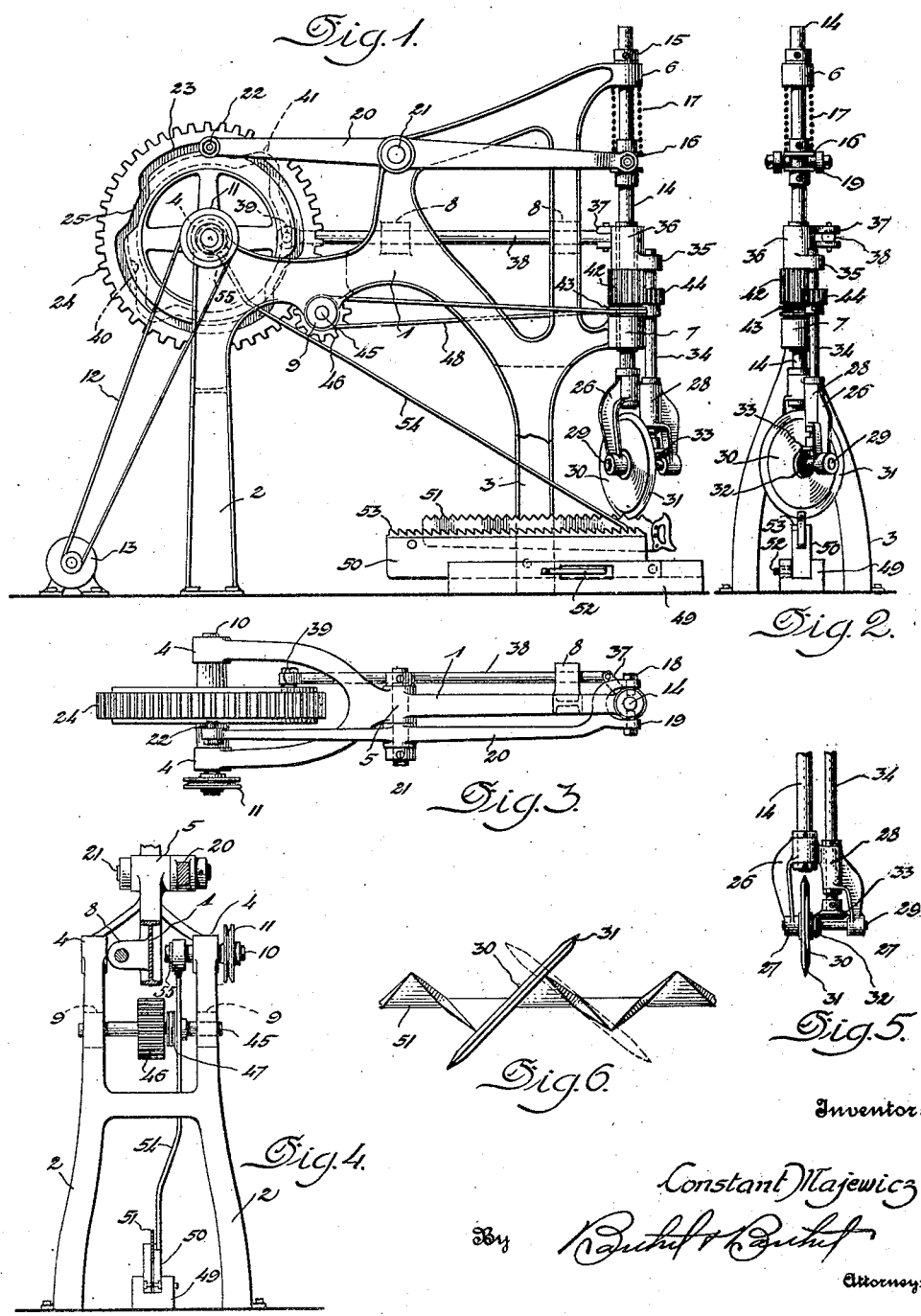

Patented Jan. 8, 1924.

1,480,172

UNITED STATES PATENT OFFICE.

CONSTANT MAJEWICZ, OF DETROIT, MICHIGAN.

SAW-SHARPENING MACHINE.

Application filed August 7, 1922. Serial No. 580,004.

*To all whom it may concern:*

Be it known that I, CONSTANT MAJEWICZ, a citizen of Poland, residing at Detroit, in the county of Wayne and State of Michigan, have invented certain new and useful Improvements in Saw-Sharpening Machines, of which the following is a specification, reference being had therein to the accompanying drawings.

This invention relates to a saw sharpening machine that may be used in large furniture factories, carpenter shops and other places for sharpening various kinds of toothed saws or instruments, particularly hand saws having teeth which must be ground or sharpened from time to time.

One of the objects of my invention is to provide a machine embodying a rotary grinding or sharpening instrumentality which may be raised and lowered relative to a saw blade and turned in a horizontal plane to different angular positions so that the facets of the saw tooth may be ground. By turning the grinding or sharpening instrumentality to different angular positions it is possible to grind the facets of two saw teeth at one time and this, together with an intermittent advancement of the saw, permits of the saw being expeditiously ground or sharpened.

Another object of this invention is to provide a saw sharpening machine with novel means for automatically adjusting a rotary sharpening or grinding instrumentality and driving such instrumentality in adjusted positions; it being only necessary to properly set a saw relative to the starting machine, and then the operations of grinding and sharpening the saw teeth are progressively and automatically carried on until all of the saw teeth have been ground or sharpened.

A further object of my invention is to provide a machine of the above type wherein the parts are compactly assembled, durable and may be cheaply manufactured.

The above and other objects are attained by the construction to be hereinafter described and then claimed, and reference will now be had to the drawing, wherein—

Figure 1 is a side elevation of the saw sharpening machine;

Fig. 2 is an end view of the same;

Fig. 3 is a plan of the machine;

Fig. 4 is a vertical cross sectional view of the machine;

Fig. 5 is a detail view of the rotary grinding or sharpening instrumentality, showing the manner of transmitting power to the same; and Fig. 6 is a diagrammatic plan of a series of saw teeth showing how the rotary grinding or sharpening instrumentality operates upon teeth facets.

In the drawing the reference numeral 1 denotes a machine frame having suitable supporting legs 2 and 3, opposed transversely disposed bearings 4, a single transverse bearing 5, vertically alining bearings 6 and 7, longitudinally alining bearings 8, and another set of transversely disposed bearings 9.

In the bearings 4 is journaled a main drive shaft 10 and on one end of said shaft is a power transmission wheel 11 over which may be trained a belt 12 whereby an electric motor 13 may be employed for driving the shaft 10. The belt 12 and the motor 13 represent a conventional form of power plant that may be employed for operating the machine and it is obvious that the motor 13 can be supported on the frame 1 and geared directly or indirectly to the main drive shaft 10.

In the vertically alining bearings 6 and 7 is a reciprocatory and oscillatory support 14 having its upper end provided with an adjustable collar 15 serving as a stop to limit the downward movement of the support 14 by impinging against the bearing 6. On the support 14, below the bearing 6, is a spool or collar 16 and encircling the support 14, between the collar 16 and the bearing 6, is a coiled expansion spring 17 which holds the support 14 normally in a lowered position. Loosely engaging in the collar or spool 16 are opposed studs 18 carried by the forked or bifurcated end 19 of a walking beam 20, said beam being mounted on a shaft 21 journaled in the bearing 5. The rear end of the walking beam 20 has a pin or antifrictional roller 22 extending into a cam groove 23 in the face of a large gear wheel 24 mounted on a drive shaft 10. The cam groove 23 has diametrically opposed dips or valleys 25 which causes the walking beam 20 to be rocked twice during one revolution of the large gear wheel 24 and the support 14 is raised and lowered by the walking beam with the expansive force of the spring 17 assisting in lowering the support.

On the lower end of the support 14 is a vertically disposed yoke or harp 26 provided with bearings 27 and 28, the latter being disposed at a right angle to the axis of the former. Journaled in the bearings 27 is a shaft 29 and mounted on said shaft is a rotary grinding or sharpening disk-like instrumentality 30 provided with a double beveled periphery 31. On the shaft 29 of the hub of the cutting instrumentality 30 is a beveled gear wheel 32 meshing with a beveled gear wheel 33 mounted on the lower end of a shaft 34, journaled in the bearing 28 and suitably supported relative to said bearing.

The upper end of the shaft 34 is journaled in a bearing 35 carried by a collar 36 mounted on the support 14 and said collar has a bifurcated crank 37 pivotally connected to a reciprocatory rod 38 slidable in the bearings 8. The rear end of the rod 38 has a pin or anti-frictional roller 39 extending into a cam groove 40 in that face of the large gear wheel 24 opposite the cam groove 23, and the cam groove 40 has diametrically opposed rises 41 to cause reciprocation of the rod 38 and oscillation of the collar 36, thus turning the yoke 26 in a horizontal plane and changing the angularity of the grinding or sharpening instrumentality 30.

Loose on the support 14, between the collar 36 and bearing 7, is a long gear wheel 42 and a sheave or pulley 43 which may be integral with the long gear wheel 42 or fixed for rotative continuity therewith. The long gear wheel 42 slidably meshes with a short gear wheel 44 fixed on the shaft 34 and when the support 14 is raised the shaft 34 slides in the bearing 35 of the collar 36 with the short gear wheel 44 sliding on the long gear wheel 42 and in this manner the support 14 can be raised and lowered without destroying the driving relation between the pulley 43 and the sharpening instrumentality 30.

Journaled in the bearings 9 is a shaft 45 and mounted on said shaft is a small gear wheel 46 and a pulley 47. The gear wheel 46 meshes with the large gear wheel 24 and is driven thereby. Trained over the pulley 47 and the pulley 43 is an endless belt 48 transmitting power from the rear end of the machine to the forward end thereof.

Mounted between the legs 3 of the machine is a longitudinally disposed guide 49 for a reciprocable or slidable saw holder 50 in which a saw blade 51 may be mounted. The holder 50 may be frictionally held in an adjusted position by a suitable tension device 52 of the guide 49, and said holder has its upper edge provided with a series of ratchet teeth 53 normally engaged by a ratchet member or pawl 54 pivotally connected to an eccentric 55 mounted on the main drive shaft 10. Actuation of the holder 50 is timed by the eccentric 55 to cause the holder to be shifted forwardly when the grinding or sharpening instrumentality 30 is raised relative to the saw blade 51.

An enlarged or magnified view of a series of saw teeth has been shown in Fig. 6 relative to the grinding or sharpening instrumentality 30 and it will be noted that this instrumentality may simultaneously operate upon beveled edges of two teeth and by raising, turning and lowering the instrumentality the beveled edges of the saw teeth may be progressively ground and sharpened as the holder 50 is advanced in the guide 49. By removing the holder 50 from the guide 49 the saw blade 51 can be removed, another saw blade placed therein, and the holder 50 set for advancement in the guide 49.

It is thought that the operation and utility of the machine will be apparent without further description, and while in the drawing there is illustrated a preferred embodiment of my invention, it is to be understood that the structural elements are susceptible to such changes, in size, shape and manner of assemblage, as fall within the scope of the appended claim.

What I claim is:—

In a saw sharpening machine, a rotary sharpening instrumentality adapted to be raised and lowered relative to a saw blade and positioned at different angles relative thereto, a support for said sharpening instrumentality, a walking beam adapted to raise and lower said support, a rotary sharpening instrumentality on said support, a reciprocatory rod adapted to turn said support to place said sharpening instrumentality at different angles relative to a saw, and a gear wheel adapted to constantly rotate said sharpening instrumentality and actuate said rod and walking beam in timed relation, said gear wheel having its faces provided with cam grooves, one for causing actuation of said walking beam and the other causing actuation of said reciprocatory rod.

In testimony whereof I affix my signature in presence of two witnesses.

CONSTANT MAJEWICZ.

Witnesses:
KARL H. BUTLER,
G. E. McGRAMM.